(12) United States Patent
Wong et al.

(10) Patent No.: US 9,877,234 B2
(45) Date of Patent: Jan. 23, 2018

(54) APPARATUS AND METHOD FOR SELECTING VOICE BEARER IN REVERSE SINGLE RADIO VOICE CALL CONTINUITY

(75) Inventors: Curt Wong, Sammamish, WA (US); Jukka Ilari Hongisto, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 209 days.

(21) Appl. No.: 14/348,927

(22) PCT Filed: Oct. 3, 2011

(86) PCT No.: PCT/US2011/054591
§ 371 (c)(1),
(2), (4) Date: Apr. 1, 2014

(87) PCT Pub. No.: WO2013/052030
PCT Pub. Date: Apr. 11, 2013

(65) Prior Publication Data
US 2014/0241321 A1    Aug. 28, 2014

(51) Int. Cl.
*H04W 36/00* (2009.01)
*H04L 29/06* (2006.01)

(52) U.S. Cl.
CPC ..... *H04W 36/0022* (2013.01); *H04L 65/1033* (2013.01); *H04L 65/1016* (2013.01)

(58) Field of Classification Search
CPC ........... H04L 65/1016; H04L 65/1033; H04W 36/0022
See application file for complete search history.

(56) References Cited

U.S. PATENT DOCUMENTS

| 7,546,125 | B2 | 6/2009 | Sharma et al. |
| 2007/0207804 | A1* | 9/2007 | Sharma ............ H04L 29/06027 455/436 |

(Continued)

FOREIGN PATENT DOCUMENTS

| CN | 1878403 A | 12/2006 |
| CN | 1984487 A | 6/2007 |

(Continued)

OTHER PUBLICATIONS

3GPP TS 23.216 V11.1.0 (Jun. 2011) Technical Specification 3rd Generation Partnership Project; Technical Specification Group Services and System Aspects; Single Radio Voice Call Continuity (SRVCC); Stage 2 (Release 11)/ Jun. 12, 2011.

(Continued)

*Primary Examiner* — Christopher Grey
(74) *Attorney, Agent, or Firm* — Squire Patton Boggs (US) LLP

(57) ABSTRACT

An apparatus and method capable of creating and controlling voice bearer in reverse single radio voice call continuity comprise performing a handover request action S64 of generating a request to a mobile management entity for a handover of a mobile communication call of a user equipment from circuit switched mobile communication to packet switched mobile communication in response to an indication of required handover S61 by a radio access network controller entity; performing a notification action S62 of notifying an access transfer control function to prepare for the transfer of media to packet switched mobile communication by allocating media ports on an access transfer gateway; and performing an obtaining action S63 of obtaining the allocated media ports from the notified access transfer control function, wherein both the notification action S62 and the obtaining action S63 are performed after the indication of required handover S61 is obtained from the radio access (Continued)

network controller entity and before the performing of the handover request action S64, and information on the allocated media ports is included into the request S64 to the mobile management entity.

6 Claims, 4 Drawing Sheets

(56) References Cited

U.S. PATENT DOCUMENTS

| | | | |
|---|---|---|---|
| 2008/0098063 A1* | 4/2008 | Huh | H04L 65/4061 709/203 |
| 2008/0205345 A1* | 8/2008 | Sachs | H04W 36/0011 370/332 |
| 2010/0142488 A1 | 6/2010 | Zhang et al. | |
| 2010/0246530 A1* | 9/2010 | Pehrsson | H04W 36/0022 370/331 |
| 2011/0110326 A1 | 5/2011 | Rexhepi et al. | |
| 2011/0206013 A1* | 8/2011 | Aramoto | H04W 36/26 370/332 |
| 2012/0027025 A1* | 2/2012 | Bekiares | H04L 47/745 370/431 |
| 2013/0010751 A1* | 1/2013 | Rydnell | H04W 36/14 370/331 |

FOREIGN PATENT DOCUMENTS

| | | |
|---|---|---|
| WO | 2007/041651 A2 | 4/2007 |
| WO | WO 2011/098137 A1 | 8/2011 |

OTHER PUBLICATIONS

3GPP TR 23.885 V1.4.0 (Jul. 2011) Technical Report 3rd Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 10).
GSMA PRD IR.92—IMS Profile for Voice and SMS, 4.0, Mar. 22, 2011.
GSMA IR.88, LTE Roaming Guidelines, 4.0, Mar. 21, 2011.
International Search Report and Written Opinion dated Jan. 31, 2012, issued in corresponding International Application No. PCT/US2011/054591.
English translation of Notice to File a Response dated Apr. 10, 2015 issued in corresponding Korean Patent Application No. 10-2014-7012067.
3GPP TR 23.885 V11.0.0 (Sep. 2011), Technical Report, 3rd Generation Partnership Project; Technical Specification Group Services and System Aspects; Feasibility Study of Single Radio Voice Call Continuity (SRVCC) from UTRAN/GERAN to E-UTRAN/HSPA, Stage 2 (Release 11), Sep. 2011, 83 pages.
Ericsson et al: "rSRVCC proposal for consolidated alternative merging Solution 5 with Solution 3"; 3GPP Draft; S2-110854_S2-110849_WAS_S2-110554_RSRVCC_CONSOLIDATED_ALT; 3rd Generation Partnership Project (3GPP); Mobile Competence Centre; 650, Route des Lucioles; F-06921 Sophia-Antipolis Cedex; France; vol. SA WG2, No. Salt Lake City; Feb. 21, 2011; Feb. 26, 2011 (Feb. 26, 2011); XP050524047; [retrieved on Feb. 26, 2011]; abstract; see sections 6.3.3.7.1-6.3.3.8.
3GPP TS 23.237 V11.2.0 (Sep. 2011) "3rd Generation Partnership Project; Technical Specification Group Services and System Aspects; IP Multimedia Subsystem (IMS) Service Continuity; Stage 2 (Release 11)"; pp. 1-154; 3rd Generation Partnership Project (3GPP); Mobile Competence Centre; 650, Route des Lucioles; F-06921 Sophia-Antipolis Cedex; France.
European Search Report application No. 11873613.1 dated May 28, 2015.
Chinese Office Action dated Jun. 19, 2017, issued in corresponding CN Application No. 201180075279.4.

* cited by examiner

APPARATUS AND METHOD FOR SELECTING VOICE BEARER IN REVERSE SINGLE RADIO VOICE CALL CONTINUITY

TECHNICAL FIELD

The present application relates generally to an apparatus and method for selecting voice bearer in reverse single radio voice call continuity.

BACKGROUND

Prior art which is related to this technical field can e.g. be found in the technical specifications TS 23.216 (current version: 11.1.0) and TR 23.885 (current version 1.4.0) of the 3GPP, as well as the permanent reference documents IR.88 (current version: 4.0) and IR.92 (current version: 4.0) of the GSMA.

The following meanings for the abbreviations used in this specification apply:
2G: 2nd Generation
3G: 3rd Generation
3GPP: 3rd Generation Partnership Project
APN: Access Point Name
ATCF: Access Transfer Control Function
CS: Circuit Switched
DL: Downlink
DTM: Dual Transfer Mode
EDGE: Enhanced Data Rates for GSM Evolution
eNB: evolved NB
EPS: Evolved Packet System
E-UTRAN: evolved UTRAN
GBR: Guaranteed Bit Rate
GERAN: GSM EDGE Radio Access Network
GPRS: General Packet Radio Service
GSM: Global System for Mobile Communication
GSMA: GSM Association
HO: Handover
HSPA: High Speed Packet Access
IMS: IP Multimedia Subsystem
IMEI: International Mobile Equipment Identity
IMSI: International Mobile Subscriber Identity
IP: Internet Protocol
ISDN: Integrated Services Digital Network
LTE: Long Term Evolution
LTE-A: LTE-Advanced
MBR: Multiple Bit Rate
MME: Mobile Management Entity
MSC: Mobile Switching Center
MSISDN: Mobile Subscriber ISDN Number
NB: Node B
PCC: Policy and Charging Control
PCRF: Policy and Charging Rules Function
P-CSCF: Proxy Call State Control Function
PDN: Packet Data Network
PDP: Packet Data Protocol
P-GW: PDN Gateway
PS: Packet Switched
QCI: QoS Class Identifier
QoS: Quality of Service
RAI: Routing Area Identity
RAN: Radio Access Network
RAT: Radio Access Technology
RTCP: RTP Control Protocol
RTP: Real Time Protocol
SGSN: Serving GPRS Support Node
S-GW: Serving Gateway
SIP: Session Initiation Protocol
SRVCC: Single Radio Voice Call Continuity
TFT: Traffic Flow Template
TMSI: Temporary Mobile Subscriber Identity
UE: User Equipment
UL: Uplink
UTRAN: Universal Terrestrial Radio Access Network
VoIP: Voice over IP
XCAP: XML Configuration Access Protocol
XML: Extensible Markup Language In the specification release 8 of the 3GPP the specification for supporting SRVCC from E-UTRAN/HSPA to UTRAN/GERAN direction has been defined. Supporting SRVCC in the other direction (which may be called reverse SRVCC) has been studied by the 3GPP in specification document TR 23.885, and one of the alternatives mentioned therein was recommended for standardization in Release 11.

A solution proposal for normative work assumes that P-GW, PCC and source SGSN do not need to be impacted and the voice media is sent using default bearer immediately after reverse SRVCC ("rSRVCC") until UE setups the QCI 1 bearer.

However, the recommended solution has a few open areas that would need closure.

For example, in the recommended access transfer procedure (see specification document TR 23.885, section 6.3.3.7.5 of version 1.4.0), the document shows call flows for the non DTM case and for the DTM case according to FIGS. 1 and 2 (FIG. 1: Access Transfer Preparation Alternative 5, non-DTM case; FIG. 2: Access Transfer Preparation Alternative 5, DTM case).

Accordingly, the call flow for the case shown in FIG. 1 is as follows, as specified by documents TR 23.885:

1. The RNC/BSC sends a "HO required" message to the MSC Server including an indication that this HO is for rSRVCC. If the MSC Server is the target MSC, it forwards the "HO required" message to the anchor MSC Server.

2. The MSC Server sends a "SRVCC CS to PS HO request" message to the Target MME. If required, the IMSI is provided for identifying the UE.

3. The MSC Server sends an "Access Transfer Notification" message to the ATCF, e.g. a SIP "re-INVITE" or "INVITE" message, which indicates the ATCF that it should prepare for the transfer of media to PS. The ATCF allocates media ports on the ATGW. The media ports and codecs allocated by the ATCF are provided to the MSC Server in the response message. This step is independent of step 2. It is to be noted that the ATCF retrieves the ports/codecs received from the UE in its IMS registration. The ATCF is able to correlate the IMS registration made by the UE and the one made by the MSC Server on behalf of the UE for instance based on the C-MSISDN or on the IMEI derived instance-id used by both those registrations. It is further to be noted that the Access Transfer Notification message could e.g., be implemented using an "INVITE" or other appropriate message. This is for further study.

4. If the MME has no UE context it sends a "Context Request" message using P-TMSI and RAI to find the old SGSN.

5. The SGSN responds with "Context Response" message including all UE contexts.

6. The Target MME allocates resources in E-UTRAN.

7. A "SRVCC CS to PS HO response" message is returned from the target MME to the MSC Server.

8. The MSC Server sends a "HO required Ack" message to the RAN, possibly via the target MSC, and the RAN sends a "HO command" to UE, indicating CS to PS handover. The MSC Server also includes in that message the IP address/ports and selected codecs for the ATGW.

9. In case of an ATCF with media anchored in ATGW, the MSC Server sends an "Access Transfer Preparation Request" message, e.g. a SIP "re-INVITE" or "PRACK" message, to the ATCF to trigger the ATCF/ATGW to have the media path switched to the IP address/port of the UE on the target access. In case of an ATCF without media anchored in ATGW, the MSC Server sends an "Access Transfer Preparation Request" message to ATCF and the media path between ATCF/ATGW and the MSC Server/MGW is to be established.

10. The UEs send a "Handover confirmation" message to the eNB.

11. The eNB sends a "Handover Notify" message to the MME.

12. The MME sends a "Modify Bearer Request" message to the SGW, which is forwarded to the PGW to update PS bearer contexts.

13. The MME sends the "Acknowledgment to the Context Response" message to the SGSN.

14. The voice media is started directly. It is to be noted that during a short period of time prior the RAT has been changed and the new bearer has been established, the media will be sent over the default bearer.

15. The UE initiates the session continuity procedures according to clause 6.3.3.8 of the specification document TR 23.885 (version 1.4.0) towards the ATCF.

16. As a result of the session continuity procedures, the bearer setup is performed (initiated by the P-CSCF).

17. The voice media is sent in the dedicated bearer.

Furthermore, the call flow for the case shown in FIG. 2 is as follows, as specified by documents TR 23.885:

The step 1 is the same as described above with reference to FIG. 1.

1a. But in the DTM case the UE is already active in PS domain, and the RNC/BSC sends also a "Relocation Required" message to source SGSN.

Then, steps 2 and 3 are the same as described above in connection with FIG. 1.

4. The Source SGSN sends "Relocation Request" message to the target MME.

5. The Target MME allocates resources in E-UTRAN.

6a. A "relocation response" message is returned to the Source SGSN.

6b. The Source SGSN sends a "HO Required Ack" message to RAN.

Thereafter, steps 7 to 11 are the same as described above in connection with FIG. 1.

12. The MME sends a "Forward relocation Complete" message to the old SGSN.

13. The MME sends a "Modify Bearer Request" message to the SGW which is forwarded to the PGW to update PS bearer contexts.

Eventually, steps 14 to 17 are again same as described above in connection with FIG. 1.

Accordingly, the above may be summarized in that some high level principles used for voice bearer switching are:

1. The UE is using CS bearer in 2G or 3G CS access for voice media, but UE has also PDP context used for IMS registration and SIP/XCAP signalling. The used PDP context is Primary PDP context to IMS APN (wherein it is to be noted that a Primary PDP context cannot have TFT).

2. SRVCC from 2G/3G CS to LTE is triggered by source radio and UE is handed over to LTE (above steps 1 to 10) and CS bearer is released.

3. After handover the voice continues in the LTE access, but there is only default bearer for IMS APN, which is used for both IMS signalling and voice media (see step 14 above).

4. The network creates, based on the IMS voice session negotiation, a dedicated EPS bearer including QCI 1, GBR/MBR and voice media packet flow information (see steps 15-16 above).

5. The UE puts voice media into established dedicated bearer for uplink direction. Similarly, the P-GW maps downlink traffic (step 16-17).

SUMMARY OF THE INVENTION

It is an object of the present invention to provide an apparatus and method for selecting voice bearer in reverse single radio voice call continuity.

According to a first aspect of the present invention, the object is accomplished by an apparatus, comprising handover processing means configured to perform a handover response action of generating a response to a mobile services switching entity for a handover of a mobile communication call of a user equipment from circuit switched mobile communication to packet switched mobile communication in response to a request for handover by the mobile services switching entity; resource allocation means configured to perform a resource allocation action of allocating resources for the packet switched mobile communication; and controlling means configured to perform a command action of commanding a packet switched mobile communication gateway entity as target of the handover of the mobile communication call to temporarily allow passing through of real time protocol and real time protocol control protocol based packets on a bearer set as default bearer in the packet switched mobile communication gateway entity, and to control the handover processing means and the resource allocation means to operate such that the command action is performed after the resource allocation means performed the resource allocation action and before the handover processing means performs the handover response action.

According to a modification of the first aspect, this apparatus may be suitable for controlling voice bearer in reverse single radio voice call continuity.

According to a second aspect of the present invention, the object is accomplished by an apparatus, comprising a handover processor configured to perform a handover response action of generating a response to a mobile services switching entity for a handover of a mobile communication call of a user equipment from circuit switched mobile communication to packet switched mobile communication in response to a request for handover by the mobile services switching entity; a resource allocation processor configured to perform a resource allocation action of allocating resources for the packet switched mobile communication; and a controller configured to perform a command action of commanding a packet switched mobile communication gateway entity as target of the handover of the mobile communication call to temporarily allow passing through of real time protocol and real time protocol control protocol based packets on a bearer set as default bearer in the packet switched mobile communication gateway entity, and to control the handover processor and the resource allocation processor to operate such that the command action is performed after the resource allocation processor performed the resource allocation action and before the handover processor performs the handover response action.

Modifications of the second aspect may correspond to the modifications of the first aspect.

According to a third aspect of the present invention, the object is accomplished by a system comprising the apparatus according to the first or second aspect; and the packet switched mobile communication gateway entity as target of the handover of the mobile communication call.

Modifications of the third aspect may be as follows.

The system according to the third aspect may be suitable for controlling voice bearer in reverse single radio voice call continuity.

The packet switched mobile communication gateway entity can be configured to set a timer for the temporarily allowing passing through of real time protocol and real time protocol control protocol based packets on a bearer set as default bearer in the packet switched mobile communication gateway entity, and to revoke the allowing after expiration of the timer.

The packet switched mobile communication gateway entity can be configured to revoke the temporarily allowing passing through after noting setup of a dedicated bearer for voice media after handover of the mobile communication call.

The command action can include an indication of uplink and downlink media addresses and port numbers and the restriction of the temporarily allowing to packet traffic with a destination identified by such indicated uplink and downlink media addresses and port numbers.

According to a fourth aspect of the present invention, the object is accomplished by a mobile management entity comprising the apparatus according to the first or second aspect or a modification thereof.

According to a fifth aspect of the present invention, the object is accomplished by a method, comprising performing a handover response action of generating a response to a mobile services switching entity for a handover of a mobile communication call of a user equipment from circuit switched mobile communication to packet switched mobile communication in response to a request for handover by the mobile services switching entity; performing a resource allocation action of allocating resources for the packet switched mobile communication; and performing a command action of commanding a packet switched mobile communication gateway entity as target of the handover of the mobile communication call to temporarily allow passing through of real time protocol and real time protocol control protocol based packets on a bearer set as default bearer in the packet switched mobile communication gateway entity, wherein the command action is performed after the resource allocation action and before the handover response action.

Modifications of the fifth aspect may be as follows.

The method according to the fifth aspect may be suitable for controlling voice bearer in reverse single radio voice call continuity.

The method can further comprise setting a timer for the temporarily allowing passing through of real time protocol and real time protocol control protocol based packets on a bearer set as default bearer in the packet switched mobile communication gateway entity, and revoking the allowing after expiration of the timer.

The method can further comprise revoking the temporarily allowing passing through after noting setup of a dedicated bearer for voice media after handover of the mobile communication call.

The performing a command action can include indicating uplink and downlink media addresses and port numbers and restricting the temporarily allowing to packet traffic with a destination identified by such indicated uplink and downlink media addresses and port numbers.

According to a sixth aspect of the present invention, the object is accomplished by a computer program product comprising computer-executable components which perform, when the program is run on a computer performing a handover response action of generating a response to a mobile services switching entity for a handover of a mobile communication call of a user equipment from circuit switched mobile communication to packet switched mobile communication in response to a request for handover by the mobile services switching entity; performing a resource allocation action of allocating resources for the packet switched mobile communication; and performing a command action of commanding a packet switched mobile communication gateway entity as target of the handover of the mobile communication call to temporarily allow passing through of real time protocol and real time protocol control protocol based packets on a bearer set as default bearer in the packet switched mobile communication gateway entity, wherein the command action is performed after the resource allocation action and before the handover response action.

Modifications of the sixth aspect may be as follows.

The computer program product according to the sixth aspect may be suitable for controlling voice bearer in reverse single radio voice call continuity.

The computer program product according to the sixth aspect may be embodied as a computer-readable storage medium.

According to a seventh aspect of the present invention, the object is accomplished by an apparatus, comprising handover processing means configured to perform a handover request action of generating a request to a mobile management entity for a handover of a mobile communication call of a user equipment from circuit switched mobile communication to packet switched mobile communication in response to an indication of required handover by a radio access network controller entity; access transfer processing means configured to perform a notification action of notifying an access transfer control function to prepare for the transfer of media to packet switched mobile communication by allocating media ports on an access transfer gateway, and to perform an obtaining action of obtaining the allocated media ports from the notified access transfer control function; and controlling means configured to control the handover processing means and the access transfer processing means to operate such that the access transfer processing means performs both the notification action and the obtaining action after the indication of required handover is obtained from the radio access network controller entity and before the handover processing means performs the handover request action, and to control the handover processing means to include information on the allocated media ports into the request to the mobile management entity.

According to a modification of the seventh aspect, this apparatus may be suitable for creating and controlling voice bearer in reverse single radio voice call continuity.

According to an eighth aspect of the present invention, the object is accomplished by an apparatus, comprising a handover processor configured to perform a handover request action of generating a request to a mobile management entity for a handover of a mobile communication call of a user equipment from circuit switched mobile communication to packet switched mobile communication in response to an indication of required handover by a radio access network controller entity; an access transfer processor configured to perform a notification action of notifying an access transfer control function to prepare for the transfer of media to packet switched mobile communication by allocating media ports on an access transfer gateway, and to perform an obtaining action of obtaining the allocated media ports from the notified access transfer control function; and a controller configured to control the handover processor and the access transfer processor to operate such that the access transfer processor performs both the notification action and the obtaining action after the indication of required handover is obtained from the radio access network controller entity and before the handover processor performs the handover request action, and to control the handover processor to include information on the allocated media ports into the request to the mobile management entity.

Modifications of the eighth aspect may correspond to the modifications of the seventh aspect.

According to a ninth aspect of the present invention, the object is accomplished by a system comprising the apparatus according to the seventh or eighth aspect; a packet switched mobile communication gateway entity; and the mobile management entity, wherein the mobile management entity is configured to use the information on the allocated media ports to create a dedicated bearer for voice media after handover of the mobile communication call with the packet switched mobile communication gateway entity.

Modifications according to the ninth aspect may be as follows.

The system according to the ninth aspect may be suitable for creating and controlling voice bearer in reverse single radio voice call continuity.

The mobile management entity can be configured to provide a traffic flow template for the dedicated bearer to the user equipment.

According to a tenth aspect of the present invention, the object is accomplished by a mobile services switching center comprising the apparatus according to the seventh or eighth aspect or a modification thereof.

According to an eleventh aspect of the present invention, the object is accomplished by a method, comprising performing a handover request action of generating a request to a mobile management entity for a handover of a mobile communication call of a user equipment from circuit switched mobile communication to packet switched mobile communication in response to an indication of required handover by a radio access network controller entity; performing a notification action of notifying an access transfer control function to prepare for the transfer of media to packet switched mobile communication by allocating media ports on an access transfer gateway; and performing an obtaining action of obtaining the allocated media ports from the notified access transfer control function, wherein both the notification action and the obtaining action are performed after the indication of required handover is obtained from the radio access network controller entity and before the performing of the handover request action, and information on the allocated media ports is included into the request to the mobile management entity.

Modifications of the eleventh aspect may be as follows.

The method according to the eleventh aspect may be suitable for creating and controlling voice bearer in reverse single radio voice call continuity.

The method can further comprise using the information on the allocated media ports by the mobile management entity to create a dedicated bearer for voice media after handover of the mobile communication call with a packet switched mobile communication gateway entity.

The method can further comprise providing a traffic flow template for the dedicated bearer by the mobile management entity to the user equipment. According to an twelfth aspect of the present invention, the object is accomplished by a computer program product comprising computer-executable components which perform, when the program is run on a computer performing a handover request action of generating a request to a mobile management entity for a handover of a mobile communication call of a user equipment from circuit switched mobile communication to packet switched mobile communication in response to an indication of required handover by a radio access network controller entity; performing a notification action of notifying an access transfer control function to prepare for the transfer of media to packet switched mobile communication by allocating media ports on an access transfer gateway; and performing an obtaining action of obtaining the allocated media ports from the notified access transfer control function, wherein both the notification action and the obtaining action are performed after the indication of required handover is obtained from the radio access network controller entity and before the performing of the handover request action, and information on the allocated media ports is included into the request to the mobile management entity.

Modifications of the twelfth aspect may be as follows.

The computer program product according to the twelfth aspect may be suitable for creating and controlling voice bearer in reverse single radio voice call continuity. The computer program product according to the twelfth aspect may be embodied as a computer-readable storage medium.

It is to be understood that any of the above modifications can be applied singly or in combination to the respective aspects to which they refer, unless they are explicitly stated as excluding alternatives.

BRIEF DESCRIPTION OF THE DRAWINGS

The above and other objects, features, details and advantages will become more fully apparent from the following detailed description of the preferred embodiments which is to be taken in conjunction with the appended drawings, in which.

DETAILED DESCRIPTION OF THE PREFERRED EMBODIMENTS

In the following, description is made to what are presently considered to be preferred embodiments of the present invention. It is to be understood, however, that the description is given by way of example only, and that the described embodiments are by no means to be understood as limiting the present invention thereto.

For example, for illustration purposes, in some of the following exemplary embodiments, selecting voice bearer in reverse single radio voice call continuity, i.e. CS to PS call continuity, in cellular communication networks as e.g. based on LTE or LTE-Advanced is described. However, it should be appreciated that these exemplary embodiments are not limited for use among these particular types of wireless communication systems, and according to further exemplary embodiments, the present invention can be applied also to other types of communication systems and access networks in which selecting a voice bearer in CS to PS handover call continuity is to be implemented and optimized.

Thus, certain embodiments of the present invention relate to mobile wireless communication systems, such as 3GPP LTE and 3GPP LTE-Advanced. In more detail, certain embodiments of the present invention are related to the configuration of an LTE MSC and components thereof and an LTE MME and components thereof, or the like.

However, as indicated above, the present invention is not limited to MSC and MME, but other embodiments of the present invention are related to switching network nodes and components thereof.

Figure 3:
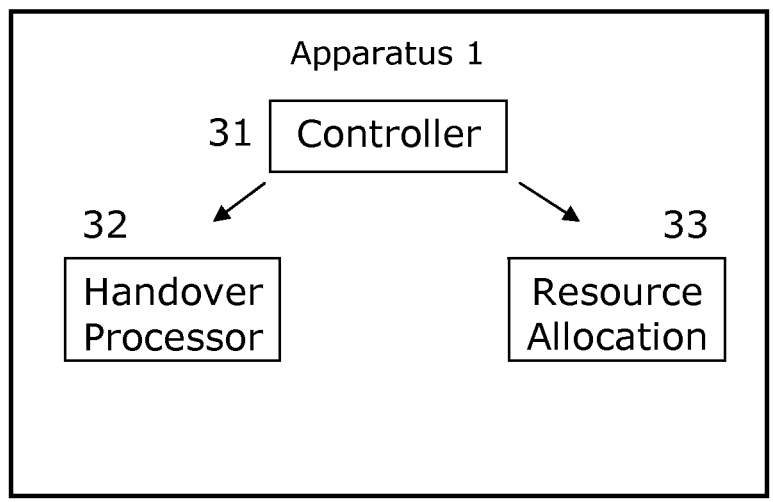
FIG. 3 shows an apparatus according to certain embodiments of the present invention.

FIG. 3 shows a principle configuration of an example for an apparatus 1 according to certain embodiments of the present invention. One option for implementing this example for an apparatus according to certain embodiments of the present invention would be a component in a MME according to LTE.

Specifically, as shown in FIG. 3, the example for an apparatus 1 comprises a handover processor 32 configured to perform a handover response action of generating a response to a mobile services switching entity for a handover of a mobile communication call of a user equipment from circuit switched mobile communication to packet switched mobile communication in response to a request for handover by the mobile services switching entity; a resource allocation processor 33 configured to perform a resource allocation action of allocating resources for the packet switched mobile communication; and a controller 31 configured to perform a command action of commanding a packet switched mobile communication gateway entity as target of the handover of the mobile communication call to temporarily allow passing through of real time protocol and real time protocol control protocol based packets on a bearer set as default bearer in the packet switched mobile communication gateway entity, and to control the handover processor 32 and the resource allocation processor 33 to operate such that the command action is performed after the resource allocation processor 33 performed the resource allocation action and before the handover processor 32 performs the handover response action.

Figure 4:
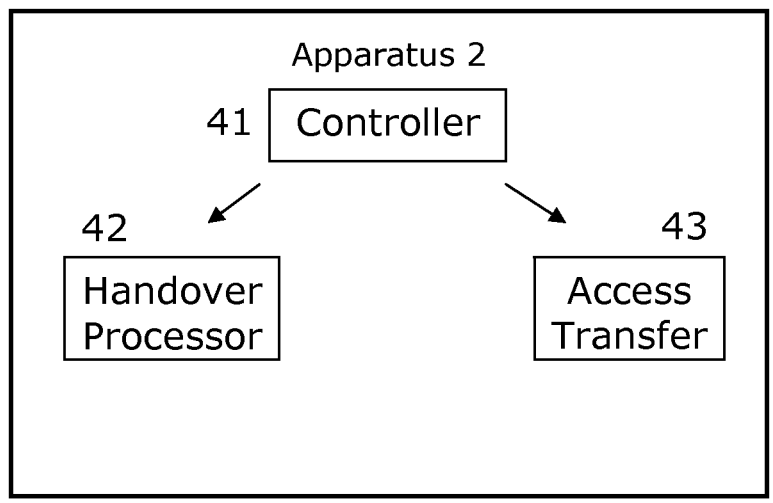
FIG. 4 shows an apparatus according to other certain embodiments of the present invention.

FIG. 4 shows a principle configuration of an example for an apparatus 2 according to certain embodiments of the present invention. One option for implementing this example for an apparatus according to certain embodiments of the present invention would be a component in a MSC according to LTE.

Specifically, as shown in FIG. 4, the example for an apparatus 2 comprises a handover processor 42 configured to perform a handover request action of generating a request to a mobile management entity for a handover of a mobile communication call of a user equipment from circuit switched mobile communication to packet switched mobile communication in response to an indication of required handover by a radio access network controller entity; an access transfer processor 43 configured to perform a notification action of notifying an access transfer control function to prepare for the transfer of media to packet switched mobile communication by allocating media ports on an access transfer gateway, and to perform an obtaining action of obtaining the allocated media ports from the notified access transfer control function; and a controller 41 configured to control the handover processor 42 and the access transfer processor 43 to operate such that the access transfer processor 43 performs both the notification action and the obtaining action after the indication of required handover is obtained from the radio access network controller entity and before the handover processor 42 performs the handover request action, and to control the handover processor 42 to include information on the allocated media ports into the request to the mobile management entity.

Figure 5:
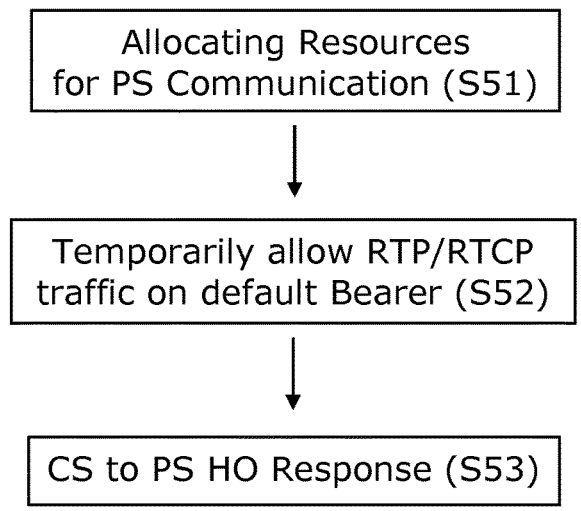
FIG. 5 shows a method according to still other certain embodiments of the present invention.

FIG. 5 shows a principle flowchart of an example for a method according to certain embodiments of the present invention. That is, as shown in FIG. 5, this method comprises performing a handover response action S53 of generating a response to a mobile services switching entity for a handover of a mobile communication call of a user equipment from circuit switched mobile communication to packet switched mobile communication in response to a request for handover by the mobile services switching entity; performing a resource allocation action S51 of allocating resources for the packet switched mobile communication; and performing a command action S52 of commanding a packet switched mobile communication gateway entity as target of the handover of the mobile communication call to temporarily allow passing through of real time protocol and real time protocol control protocol based packets on a bearer set as default bearer in the packet switched mobile communication gateway entity, wherein the command action S52 is performed after the resource allocation action S51 and before the handover response action S53.

One option for performing the example of a method according to certain embodiments of the present invention would be to use the apparatus 1 as described above or a modification thereof which becomes apparent from the embodiments as described herein below.

Figure 6:
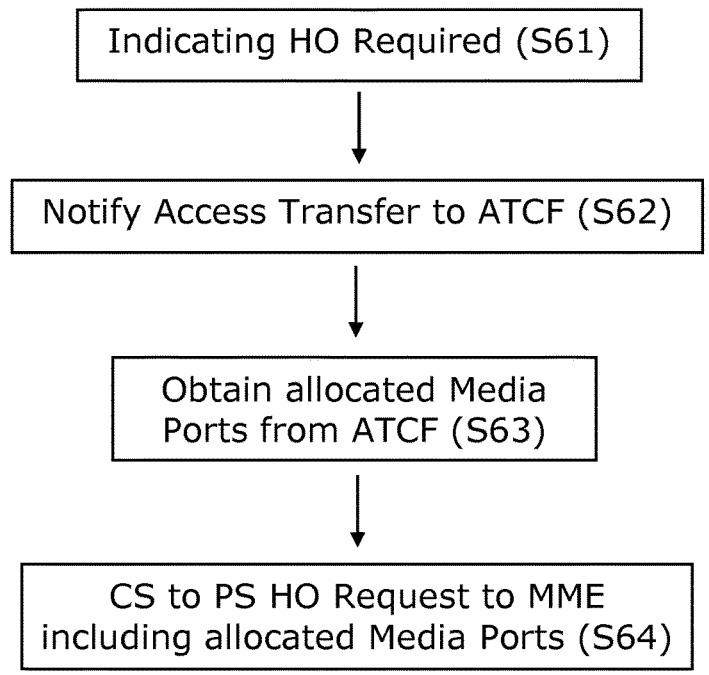
FIG. 6 shows a method according to still other certain embodiments of the present invention.

FIG. 6 shows a principle flowchart of an example for another method according to certain embodiments of the present invention. That is, as shown in FIG. 6, this method comprises performing a handover request action S64 of generating a request to a mobile management entity for a handover of a mobile communication call of a user equipment from circuit switched mobile communication to packet switched mobile communication in response to an indication of required handover S61 by a radio access network controller entity; performing a notification action S62 of notifying an access transfer control function to prepare for the transfer of media to packet switched mobile communication by allocating media ports on an access transfer gateway; and performing an obtaining action S63 of obtaining the allocated media ports from the notified access transfer control function, wherein both the notification action S62 and the obtaining action S63 are performed after the indication of required handover S61 is obtained from the radio access network controller entity and before the performing of the handover request action S64, and information on the allocated media ports is included into the request S64 to the mobile management entity.

One option for performing the example of another method according to certain embodiments of the present invention would be to use the apparatus 2 as described above or a modification thereof which becomes apparent from the embodiments as described herein below.

Certain embodiments of the present invention are described herein below in further detail. Reference is made to implementation examples which depict certain embodiments of the present invention. It is to be noted though, that the implementation examples are provided for illustrative purposes only and are not intended to be understood as limiting the invention thereto. Rather, it is to be understood that the features of the implementation examples may be interchanged and mixed as will be understood from the whole of the present specification.

In the above referenced specification document TR 23.885 (version 1.4.0) it is not defined how the default bearer is used temporary for the voice media. For the IMS VoIP the well known IMS APN is used, which is limited to IMS services only, as specified by permanent reference document IR.92 of the GSMA:

"The IMS application must use the IMS well known APN as defined in PRD IR.88; any other application must not use this APN. A standardised QCI value of five (5) must be used for the default bearer. It is used for IMS SIP signalling."

This means that normally, the PDN-GW would only allow packets related to IMS signalling (SIP and XCAP) to pass through and other types of packets are prevented. This type of prevention is done by having a policy rule installed at the P-GW and possibly also signalled with a TFT to the UE.

Without any TFT information, the UE may abuse QCI-5 (which is a high priority QCI) for carrying other types of IMS or non IMS related traffic, and the PDN-GW can silently drop the traffic. Therefore, a mechanism is needed to ensure that the PDN-GW allows the voice media to temporarily transverse through PDN-GW during rSRVCC procedure. At present, 3GPP has not discussed this issue. According to a first implementation example a solution involves a temporary RTP flow based on MME indication. This implementation example comprises the following:

a. In normal condition, PDN-GW (i.e. PCEF) is configured to ensure that only IMS signalling packets are sent toward UE or toward the PDN from the UE.

b. During rSRVCC procedure, prior to step 7 in FIGS. 1 and 2 (i.e., prior to responding back to 2G/3G with the positive relocation response), the MME indicates to PDN-GW to allow RTP and RTCP packets to momentarily pass-through on the default bearer. The P-GW can use a local timer to control the duration of how long the RTP/RTCP packets can traverse through. The MME can also indicate to PDN-GW the UL and DL media IP address and/or port number so that P-GW only allows those RTP packet toward/from that destination to momentarily pass-through. Alternatively, the MME can send a new RAT in "Modify bearers" (step 12 in FIG. 1 or step 13 in FIG. 2) that triggers local policy data in P-GW to allow RTP/RTCP. The P-GW may also ask policy from PCRF. In this case, a timer is also needed because new RAT comes also in PS-PS HO case. As a further alternative, the MME can also send rSRVCC indication that tells to PGW to allow and disallow RTP/RTCP (i.e., no timer needed).

c. After rSRVCC, UE is sending voice media using the default bearer momentary as shown in step 14 in the figures and switches over to QCI-1 in steps 16-17. The PDN-GW restricts the RTP via the default bearer either based on the local timer expiration or based on QCI-1 established.

The first implementation example follows the principles currently used by the specification TR 23.885 (version 1.4.0) where the QCI-1 bearer is created after UE has connected to E-UTRAN. It also provides a mechanism on how to address the "temporary user plane pass-through via QCI-5" issue which is missing in the specification TR 23.885 (version 1.4.0).

Figure 1:
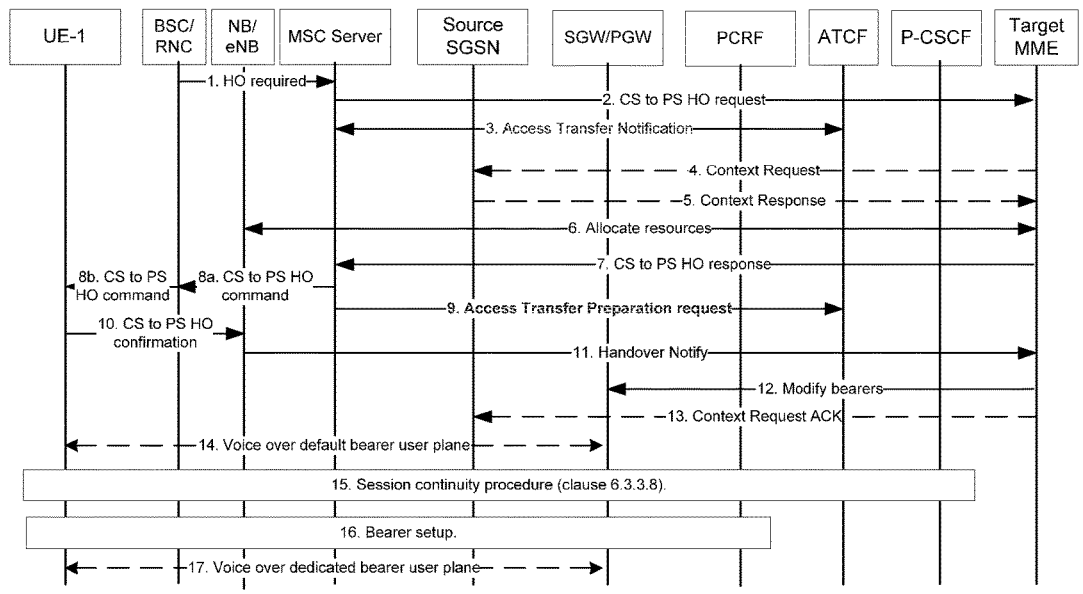
FIG. 1 shows a known access transfer preparation alternative for the non-DTM case.
Figure 2:
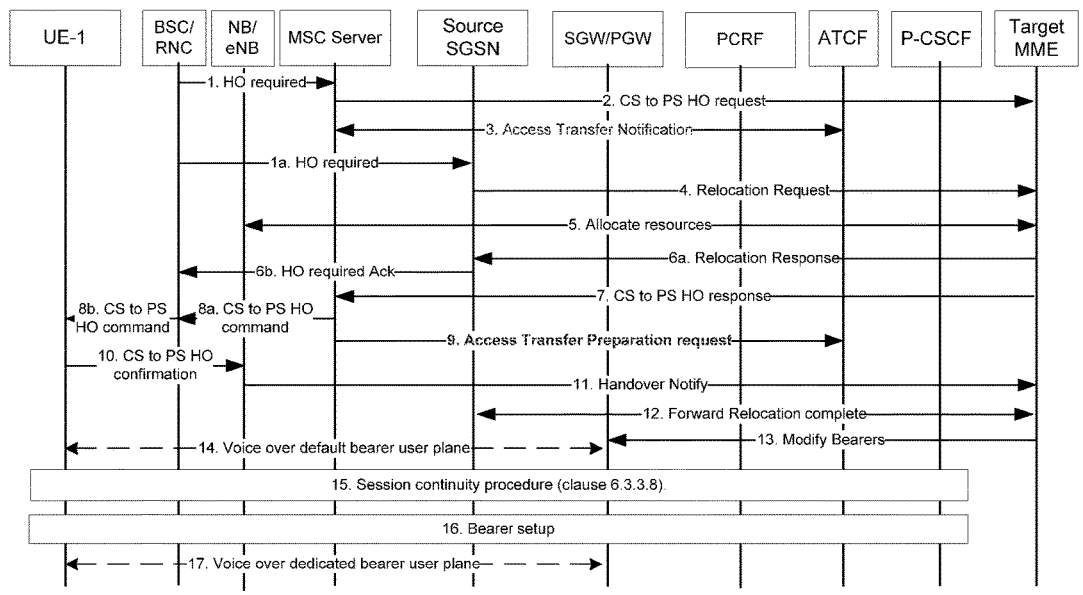
FIG. 2 shows the known access transfer preparation alternative for the DTM case.

According to a second implementation example a solution involves a QCI-1 creation during rSRVCC by the MME. This implementation example comprises the following:

The order of steps 2 and 3 in FIGS. 1 and 2 is swapped. This allows the MSC server to obtain the UL media IP/port from the ATCF which the UE will use for sending voice media on the LTE side before initiating CS to PS HO request to MME. The MSC Server is already aware of the DL IP address and port number that the UE is using for receiving media on the LTE side based on some NAS procedure which is not specified here in detail. In a new step 3, the MSC Server includes this DL/UL IP/port information to the MME. Thereafter, the MME can then use this information to create QCI-1 bearer with the PDN-GW and the TFT for this QCI-1 can be sent back to UE via "CS to PS HO response" (step 7 in FIGS. 1 and 2). It is noted that the MME may also use modify bearer procedure to indicate the eNb information to S-GW to indicate the eNb information after step 6 of FIGS. 1 and 2. In step 14 of FIGS. 1 and 2, the UE is sending voice media on the dedicated voice bearer (QCI-1) and there is no need to swap the media from default to QCI-1.

The second implementation example does not impose any special restriction on default bearer. The UE can immediately use the QCI-1 bearer for voice after rSRVCC which may provide a better user experience. The second implementation example also does not require the MSC server to append the UL media IP/port information to UE during the CS to PS HO command in step 8a of FIGS. 1 and 2 which is normally not a function of the MSC or the source side.

The second implementation example also allows target Nb/eNb to reject this handover if the radio resources corresponding to PS voice media (QCI-1) is not fulfilled (i.e, during congesting). This indication allows the source side to maintain the CS voice call and to reattempt the Handover at a later time or to another target cell. This type of implementation maintains the typical handover principle where the target side reserves the needed radio and core resources before granting the handover request to the source side.

Hereinafter, the second implementation example is described in even further detail by referring to FIGS. 7 and 8.

Figure 7:
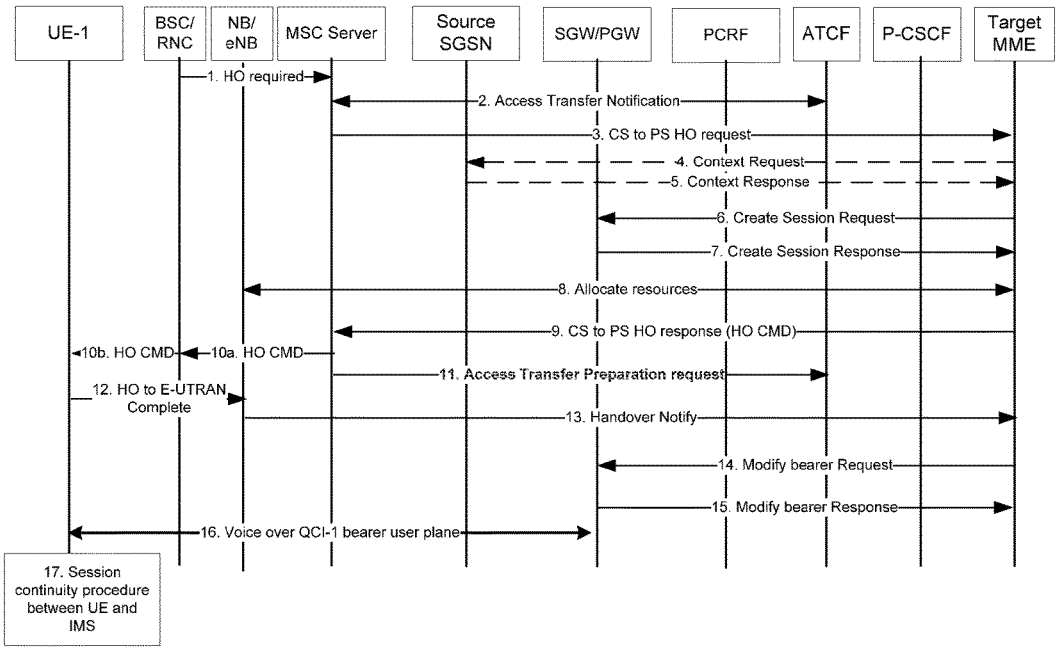
FIG. 7 shows an implementation example according to still other certain embodiments of the present invention.

FIG. 7 shows a call flow for SRVCC from GERAN/UTRAN to E-UTRAN without DTM support according to the second implementation example.

1. The BSC/RNC sends a "HO required" message to the MSC Server including an indication this HO is for rSRVCC. If the MSC Server is the target MSC, it forwards the "HO required" message to the anchor MSC Server.

2. The MSC Server sends an "Access Transfer Notification" message to the ATCF, e.g. a SIP "re-INVITE" or "INVITE" message, which indicates the ATCF that it should prepare for the transfer of media to PS. The ATCF allocates media ports on the ATGW. The media IP/ports and codecs allocated by the ATCF for the UL direction are provided to the MSC Server in the response message.

3. The MSC Server sends a SRVCC "CS to PS HO request" message to the Target MME. This message includes the voice media for PS bearer (i.e., ATGW's media IP/ports and UE's ports and codec). If required, the IMSI is provided for identifying the UE.

4. If the MME has no UE context it sends a "Context Request" message using P-TMSI and RAI to find the old SGSN.

5. The SGSN responds with a "Context Response" message including all UE contexts.

6. The MME creates the QCI-1 bearer with codecs and IP/ports information of ATGW and UE with a "Create Session Request" message.

7. A "Create Session Response" message includes the TFT for QCI-1.

8. The Target MME allocates resources in E-UTRAN.

9. A SRVCC "CS to PS HO response" message is returned from the Target MME to the MSC Server including the TFT with QCI-1.

10. The MSC Server sends a "HO required Ack" message to the RAN, possibly via the Target MSC, and the RAN sends a "HO command" message to UE, indicating CS to PS handover.

11. In case of ATCF with media anchored in ATGW, the MSC Server sends an "Access Transfer Preparation Request" message, e.g. a SIP "re-INVITE" or "PRACK" message, to the ATCF to trigger the ATCF/ATGW to have the media path switched to the IP address/port of the UE on the target access. In case of ATCF without media anchored in ATGW, MSC Server sends an "Access Transfer Preparation Request" message to ATCF and the media path between ATCF/ATGW and the MSC Server/MGW is to be established.

12. The UEs send a "Handover confirmation" message to the eNB.

13. The eNB sends a "Handover Notify" message to the MME.

14-15. The MME sends a "Modify Bearer Request" message to the SGW, which is forwarded to the PGW to update PS bearer contexts which is then responded.

16. The voice media is started directly with QCI-1.

17. The UE initiates the session continuity procedures, e.g. according to specification TS 23.237 of 3GPP towards the ATCF.

Figure 8:
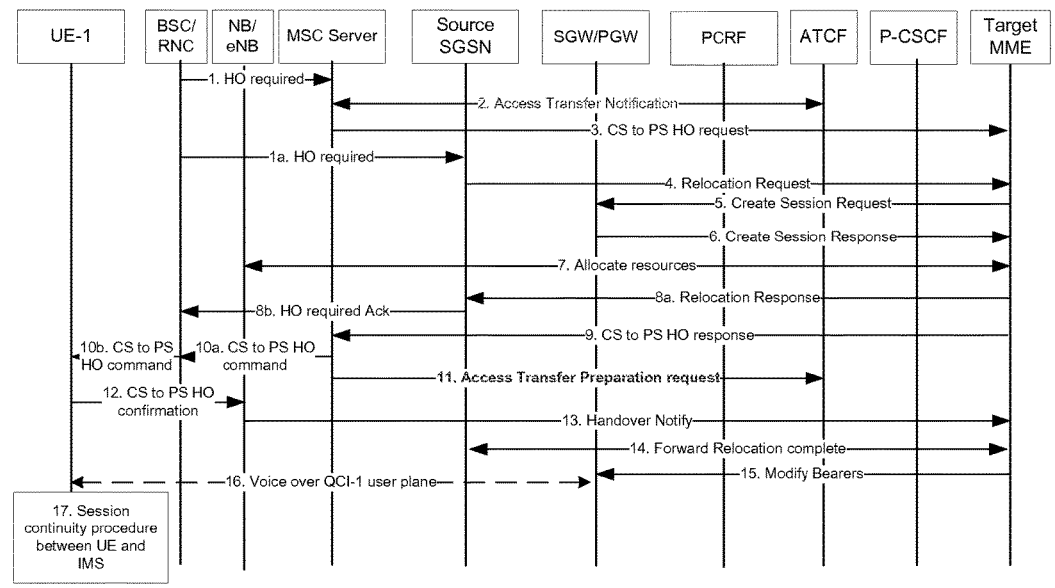
FIG. 8 shows another implementation example according to still other certain embodiments of the present invention.

FIG. 8 shows a call flow for SRVCC from GERAN/UTRAN to E-UTRAN with DTM HO support, including the handling of the non-voice component.

1. The BSC/RNC sends a "HO required" message to the MSC Server including an indication that this HO is for rSRVCC. If the MSC Server is the target MSC, it forwards the "HO required" message to the anchor MSC Server.

1a. In the DTM case the UE is active in PS domain, and the BSC/RNC sends also a "Relocation Required" message to source SGSN.

2. The MSC Server sends an "Access Transfer Notification" message to the ATCF, which indicates to the ATCF that it should prepare for the transfer of media to PS. The ATCF allocates DL media ports on the ATGW. The media IP/ports and codecs allocated by the ATCF are provided to the MSC Server in the response message.

3. The MSC Server sends a SRVCC "CS to PS HO request" message to the Target MME. If required, the IMSI is provided for identifying the UE.

4. The Source SGSN sends a "Relocation Request" message to the target MME.

5. The MME creates the QCI-1 bearer with codec and IP/ports info of ATGW and UE with a "Create Session Request" message.

6. A "Create Session Response" message includes the TFT for QCI-1.

7. The Target MME allocates resources in E-UTRAN.

8a. A "relocation response" message is returned to the Source SGSN.

8b. The Source SGSN sends a "HO Required Ack" message to RAN.

9. A SRVCC "CS to PS HO response" message is returned from the Target MME to the MSC Server including the TFT for QCI-1 bearer.

10. The MSC Server sends a "HO required Ack" message to the RAN, possibly via the Target MSC, and the RAN sends a "HO command" message to UE, indicating CS to PS handover.

11. In case of ATCF with media anchored in ATGW, the MSC Server sends an "Access Transfer Preparation Request" message, e.g. a SIP "re-INVITE" or "PRACK" message, to the ATCF to trigger the ATCF/ATGW to have the media path switched to the IP address/port of the UE on the target access. In case of ATCF without media anchored in ATGW, MSC Server sends an "Access Transfer Preparation Request" message to ATCF and the media path between ATCF/ATGW and the MSC Server/MGW is to be established.

12. The UEs send a "Handover confirmation" message to the eNB.

13. The eNB sends a "Handover Notify" message to the MME.

14. The MME sends a "Forward relocation Complete" message to the old SGSN.

15. The MME sends a "Modify Bearer Request" message to the SGW which is forwarded to the PGW to update PS bearer contexts.

16. The voice media is started directly using the TFT on QCI-1.

17. The UE initiates the session continuity procedures according to specification TS 23.237 of 3GPP towards the ATCF.

As indicated above, certain embodiments of the present invention include MSC and MME equipment such as according to LTE/LTE-Advanced, but are not limited thereto.

According to the above description, it should thus be apparent that exemplary embodiments of the present invention provide, for example from the perspective of a network element such as an MSC or MME or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods and computer program products capable of selecting voice bearer in reverse single radio voice call continuity.

Implementations of any of the above described blocks, apparatuses, systems, techniques or methods include, as non limiting examples, implementations as hardware, software, for example in connection with a digital signal processor, an instruction set, firmware, special purpose circuits or application logic, general purpose hardware or controller or other computing devices, or some combination thereof. Software or application logic or an instruction set may be maintained on any one of various conventionally available computer-readable media (which shall be understood as anything which can contain, store, communicate, propagate or transport instructions in connection with an instruction execution system). Further, it is to be understood that where reference is made to a processor, such processor is to be understood in its broadest sense and may, for example, additionally comprise or not comprise a memory (e.g., ROM, CD-ROM, etc.), and it may comprise a computer processor, an application-specific integrated circuit (ASIC), a field-programmable gate array (FPGA), and/or other hardware components that have been programmed in such a way to carry out the described function.

If desired, the different functions discussed herein may be performed in a different order and/or concurrently with each other. Furthermore, if desired, one or more of the above-described functions may be optional or may be combined.

Although various aspects of the invention are set out in the appended independent claims, other aspects of the invention comprise other combinations of features from the described embodiments and/or the dependent claims with the features of the independent claims, and not solely the combinations explicitly set out in the claims.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

The invention claimed is:

1. An apparatus, comprising:
a processor configured to perform a handover response action of generating a response to a mobile services switching entity for a handover of a mobile communication call of a user equipment from circuit switched mobile communication to packet switched mobile communication in response to a request for handover by the mobile services switching entity;
a resource allocator configured to perform a resource allocation action of allocating resources for the packet switched mobile communication; and
a controller configured to perform a command action of commanding, after the resource allocator performed the resource allocation action and before the processor performs the handover response action, a packet switched mobile communication gateway entity being a target of the handover of the mobile communication call to temporarily allow passing through of real time protocol and real time protocol control protocol based packets on a bearer set as default bearer in the packet switched mobile communication gateway entity.

2. A mobile management entity comprising the apparatus according to claim 1.

3. A method, comprising:
performing a handover response action of generating a response to a mobile services switching entity for a handover of a mobile communication call of a user equipment from circuit switched mobile communication to packet switched mobile communication in response to a request for handover by the mobile services switching entity;
performing a resource allocation action of allocating resources for the packet switched mobile communication; and
performing a command action of commanding, after the resource allocation and before the handover response action, a packet switched mobile communication gateway entity as target of the handover of the mobile communication call to temporarily allow passing through of real time protocol and real time protocol control protocol based packets on a bearer set as default bearer in the packet switched mobile communication gateway entity.

4. The method according to claim 3, further comprising:
setting a timer for the temporarily allowing passing through of real time protocol and real time protocol control protocol based packets on a bearer set as default bearer in the packet switched mobile communication gateway entity, and
revoking the allowing after expiration of the timer.

5. The method according to claim 3, further comprising:
revoking the temporarily allowing passing through after noting setup of a dedicated bearer for voice media after handover of the mobile communication call.

6. The method according to claim 3, wherein
the performing a command action includes indicating uplink and downlink media addresses and port numbers and restricting the temporarily allowing to packet traffic with a destination identified by such indicated uplink and downlink media addresses and port numbers.

* * * * *